(12) United States Patent
Galan et al.

(10) Patent No.: US 6,170,642 B1
(45) Date of Patent: Jan. 9, 2001

(54) AERIAL SYSTEM FOR TRANSPORTATION, STORAGE, CLASSIFICATION AND CONTROL OF LIGHT PRODUCTS

(75) Inventors: Mario Andrada Galan; Juan Carlos Cristos; Javier Fernandez Juarez, all of Madrid (ES)

(73) Assignee: Investronica Sistemas S.A., Madrid (ES)

( * ) Notice: Under 35 U.S.C. 154(b), the term of this patent shall be extended for 0 days.

(21) Appl. No.: 09/086,835

(22) Filed: May 29, 1998

(30) Foreign Application Priority Data

May 30, 1997 (ES) .................................................... 9701192

(51) Int. Cl.⁷ .................................................. B65G 37/02
(52) U.S. Cl. .................. 198/678.1; 198/349; 198/346.1; 198/465.4
(58) Field of Search ..................................... 198/349, 350, 198/346.1, 465.4, 687.1, 678.1

(56) References Cited

U.S. PATENT DOCUMENTS

| | | |
|---|---|---|
| 3,592,141 | 7/1971 | Davidson . |
| 4,903,819 * | 2/1990 | Heinold et al. .................. 198/465.4 |
| 4,939,999 * | 7/1990 | Burt et al. ........................ 198/465.4 |
| 5,141,094 * | 8/1992 | Speckhart et al. ................... 198/349 |
| 5,325,972 * | 7/1994 | Prydtz et al. ........................ 198/349 |
| 5,351,803 * | 10/1994 | Speckhart et al. ................ 198/465.4 |
| 5,361,890 * | 11/1994 | MeDonald et al. ............... 198/687.1 |
| 5,377,814 * | 1/1995 | Smith et al. ...................... 198/687.1 |
| 5,388,703 * | 2/1995 | Schnonenberger et al. ....... 198/465.4 |
| 5,404,989 * | 4/1995 | Veen et al. ........................ 198/465.4 |
| 5,664,659 * | 9/1997 | Gaertner ............................ 198/465.4 |
| 5,799,769 * | 9/1998 | Heer et al. ........................ 198/687.1 |

FOREIGN PATENT DOCUMENTS

| | | | |
|---|---|---|---|
| 0 093 863 | 6/1990 | (EP) | ............................. B65G/37/02 |
| 555255/9 | 5/1986 | (ES) | ............................. B65G/35/06 |
| 2 124 989 | 2/1984 | (GB) . | |

* cited by examiner

Primary Examiner—Douglas Hess
(74) Attorney, Agent, or Firm—Chapman & Cutler

(57) ABSTRACT

An aerial system is formed by a main closed circuit with diverse stations on both sides of the circuit, along which the production units move hanging on carriages having means of identification, control cards for the status and the main circuit. The main circuit includes a series of identical strips, articulated on primary supports that have a holding part and a trigger to support the carriages with hanging lightweight components. The carriages have a cylindrical holder on the top to hang the primary supports on the wheel triggers. The carriages enter the lowest point at the stations, move up to the main circuit by means of a hoist mechanism which includes a carriage presence detector at the lowest point.

12 Claims, 7 Drawing Sheets

AERIAL SYSTEM FOR TRANSPORTATION, STORAGE, CLASSIFICATION AND CONTROL OF LIGHT PRODUCTS

FIELD OF THE INVENTION

The present invention relates to a system for transportation, storage, classification and control of hanging lightweight products, and more particularly to systems used in the tailoring industry and in similar fields.

The aerial system of this invention is especially useful in the process of manufacturing lightweight products that may be transported hanging, whether directly or on intermediate supports. The system allows active and passive control of the products from the beginning of the manufacturing process until their classified output for consignment. The passive control involves knowledge of the location and status of each production unit throughout the process controlled by the system. The active control involves making decisions and executing actions to modify the situation and/or state of each production unit throughout the process controlled by them may include automatic warehouses for the production units at any stage of the production process.

BACKGROUND OF THE INVENTION

The systems for transportation, storage, classification and control of hanging lightweight products are well known in the prior art. There are products on the market that may perform the same general function. What makes them different are the means to achieve the objectives. The basic differences lie in the design of the transporter, in the supports of the production units or carriages, in the means for identification and in the control logic of the system. These products are not profitable in a wide range of industries within their field of application, either due to their size, or due to their high cost and the production costs in the countries in which they are located.

Some of these transporters form a main circuit designed in such a manner as to prevent detours to the left and right from the main traveling direction of the transport system as described in U.S. Pat. No. 3,592,141 and UK Patent Application GB 2 124 989. This characteristic means that the main circuit must be longer for the same number of work posts than for transporters that may have both detours, as in the case of the transporter of the present invention, which effects the cost of the transporter and the surface area it occupies.

Other transporters that may have detours to the both sides of the main circuit are formed by a guide rail on which the drive element for the production unit supports or carriages run, which do not rest on the rail, but on another one on which they travel (Spain Invention U.S. Pat. No. 5,552,558). This rail duplication has a repercussion on the cost of the transporter.

As to the invention described in the publication No. EP 0 093 863, the aforementioned differences are applicable.

These basic differences imply others in the detour mechanisms and the actual support carriages of the production units, as will be seen in the following description.

SUMMARY OF THE INVENTION

The priority objective of this invention is the concept of resources that are specified in an obviously more economic materialization of the system. In this sense, the transporter in this invention has important differences compared with the existing ones on the market. This invention is an automatic system that integrates the operations of transport, storage, classification and control of production of lightweight products that may be transported and/or stored hanging, from the beginning of the production process, or from any phase of it, until their output classified as a finished product.

The system includes a transporter for hanging products formed by a closed circuit along which the production units can be moved between the different areas for work, storage or classification. The production units are moved hanging from intermediate supports or carriages that include an identification code that may be recognized at different points of the transport system by means for reading the identification codes of the production units or their supports. The intermediate supports travel around the main circuit hanging from other primary supports while the stations, or areas for work, storage and/or classification move on wheels. The system includes diverse mechanisms to route the production units from said circuit to the work, storage and/or classification zones, and to return them from said zones to the closed circuit. The diverse means for communication located in the work, storage and/or classification zones may exchange information between the system control unit and operators.

The input of the carriages to the main circuit and their hanging on the primary supports is performed by mechanisms that guarantee synchronization of the movements. Activation of the holding device releases the cage so it detours to the left or right. The primary supports are joined to a series of band strips that are rigid to traction and elastically deformable to flexion, so the supports are located at a constant distance and one of the stretches leading off each support is articulated on it as to a horizontal axis. With this layout, the set formed by the strips of band and the primary supports may by moved and guided along a rail forming horizontal curves by flexion of the band stretches, or vertical curves by articulation of the supports. The traction system for movement of the set is formed by one or several motor sets that act on the strips of band through specific wheels.

The carriages have an identification code, that may be a bar code, to be read at adequate points of the main circuit, preferably between detours and entrances to control the position of the carriages and thus of the production units. The means to identify the codes shall be adequate: the conception of the carriages and their means of movement on the main circuit allows use of means of identification with a small tolerance (about 2 mm), and thus the most economic and reliable ones. The relationship between the code on each carriage and the type of product hung, as well as the initial assignment of routes or modification of these according to the real flow of the production, and all the other functions concerning the passive and active control of the production units may be performed using the appropriate computing resources.

A fundamental contribution of this invention is the possibility of having detours and entrances to/from the main circuit on both sides, without requiring a rolling rail for the carriages on said main circuit.

DESCRIPTION OF THE DRAWINGS

The detailed description of the system according to the preferred embodiment of the present invention makes reference to the following figures.

DETAILED DESCRIPTION OF THE PREFERRED EMBODIMENT

Figure 1:
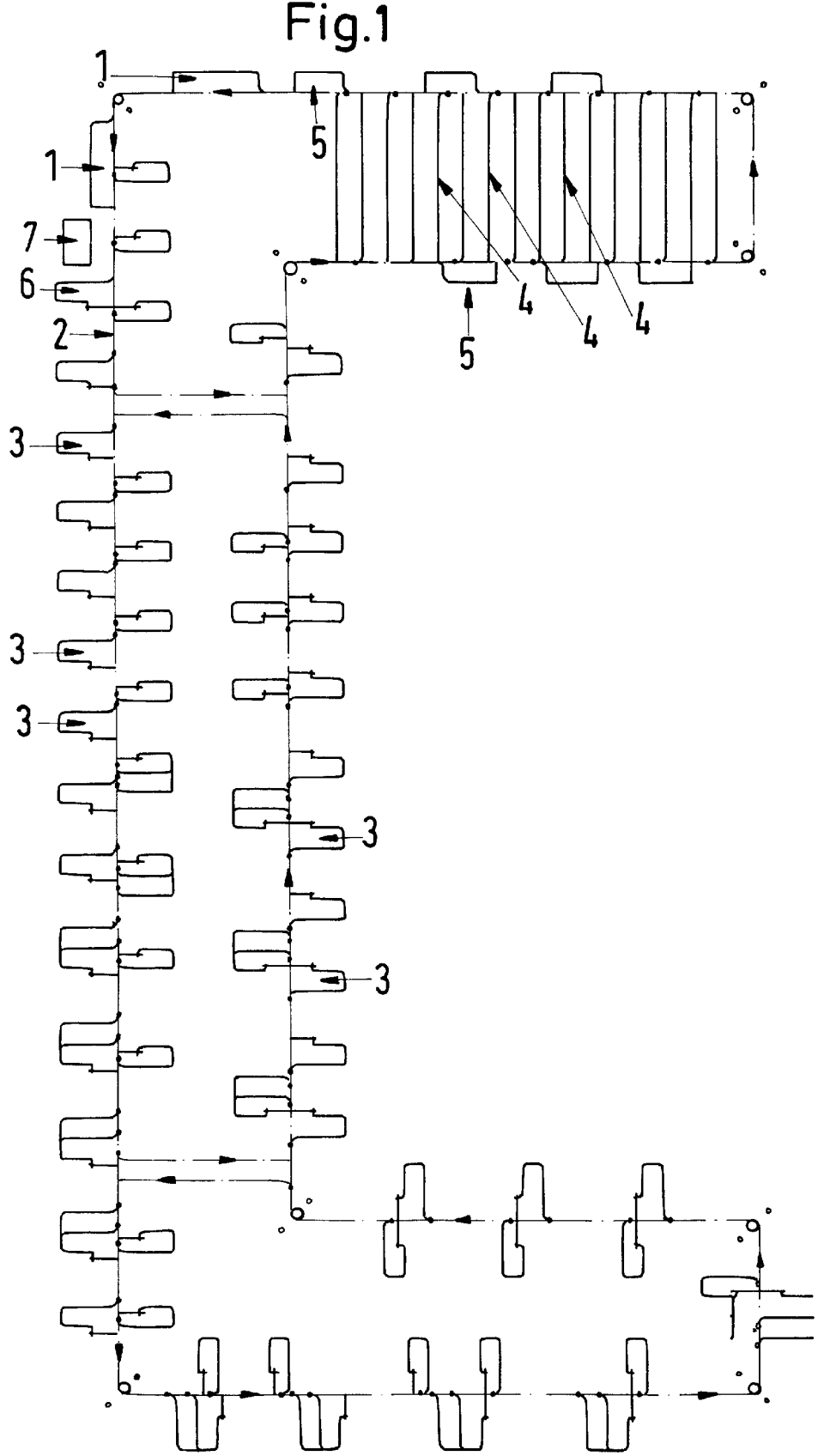
FIG. 1 is the main circuit of the aerial system of the invention

The main components forming the system for automatic transportation, storage, classification and control of production of hanging light products such as those in the tailoring industry, or similar are shown in FIG. 1. One or several loading stations (1) or entrance for the product ion units to the main circuit (2) which distributes them among the work stations (3) according to routes programmed by preset criteria, in which, once the operations assigned in the production process are performed, the units are returned to the main circuit that distributes them again among the stations where the next operation is to be performed, and so on until completing the production process. The production units are then distributed to the storage rails (4) where they remain until required for consignment as a finished product, and they are then taken to the classified output rails (5), where they may be located in the order required. The defects control station (6) receives the production units that have defects while in the system. The control post (7) includes a computer with the programming and the appropriate means of communication to perform the active and passive control of the system and the production units in it.

Figure 2:
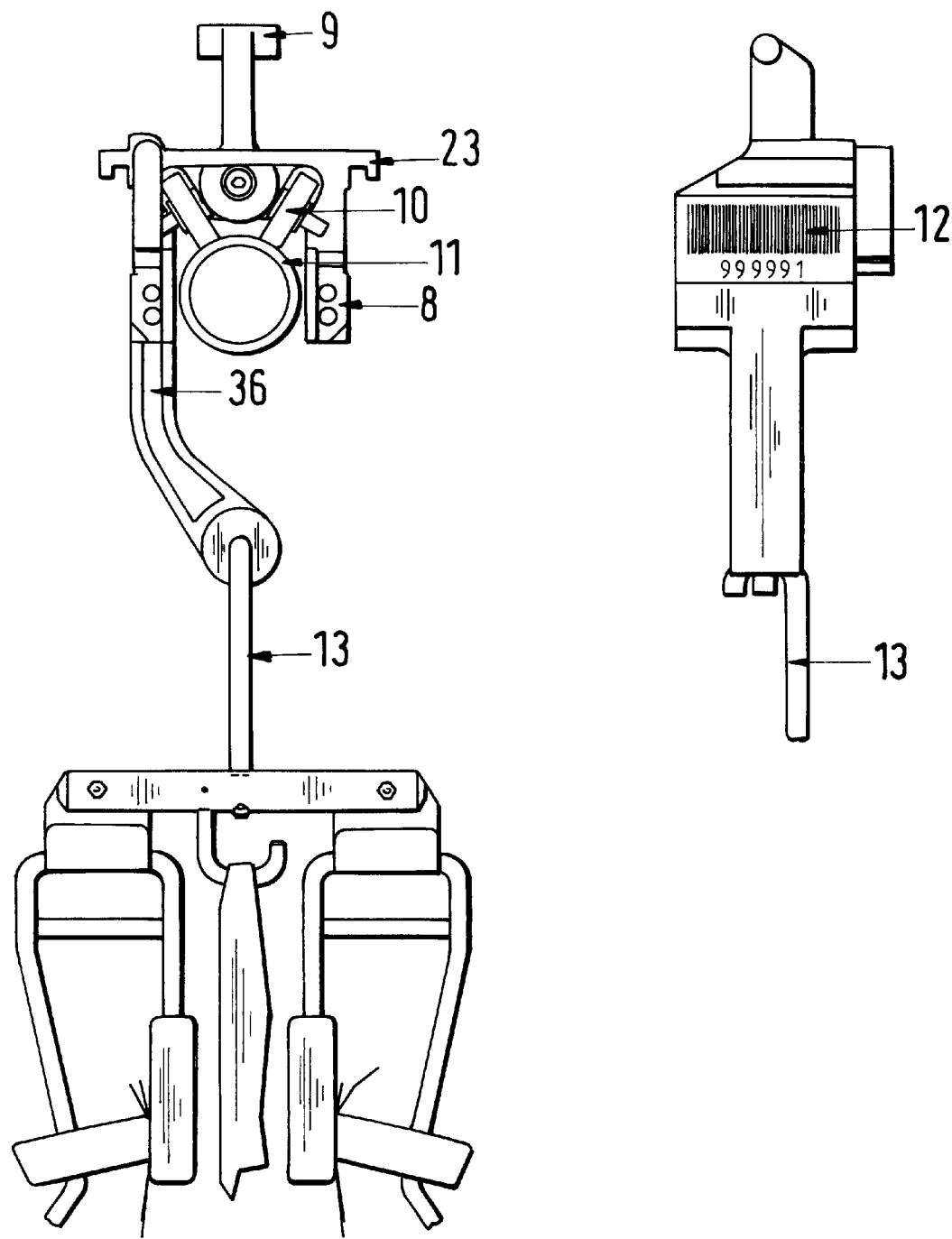
FIG. 2 represents a carriage, or intermediate support, for the production units with a hanger and the parts hanging on it.

The production units generally consist of a series of components of one or several units of product that are joined together or transformed throughout the production process operations until the finished product units are obtained. These components are placed on adequate holders that are specifically designed according to the shape of these components and the production operations, to facilitate their handling. In the case of a tailoring workshop, the support may be a hanger, so hereinafter (see FIG. 2) we shall call the support element (13) a hanger, whatever its real shape may be. The hangers always travel on intermediate supports or carriages (8), that in turn travel hanging from the main circuit on the connection cylindrical holder (9), resting on wheels (10) on the station rails (11). The carriages have flanges (23) on either side with the appropriate shape to be caught by the hoist mechanism. The carriages include a bar code (12), as the identification code, located on one or both sides of the body of the carriage. The loading station links the identification code to the type of production unit on each carriage (series, style, size, color, destination, etc.), so readers appropriately located may be used to monitor the position and status of each production unit at all times.

Figure 3:
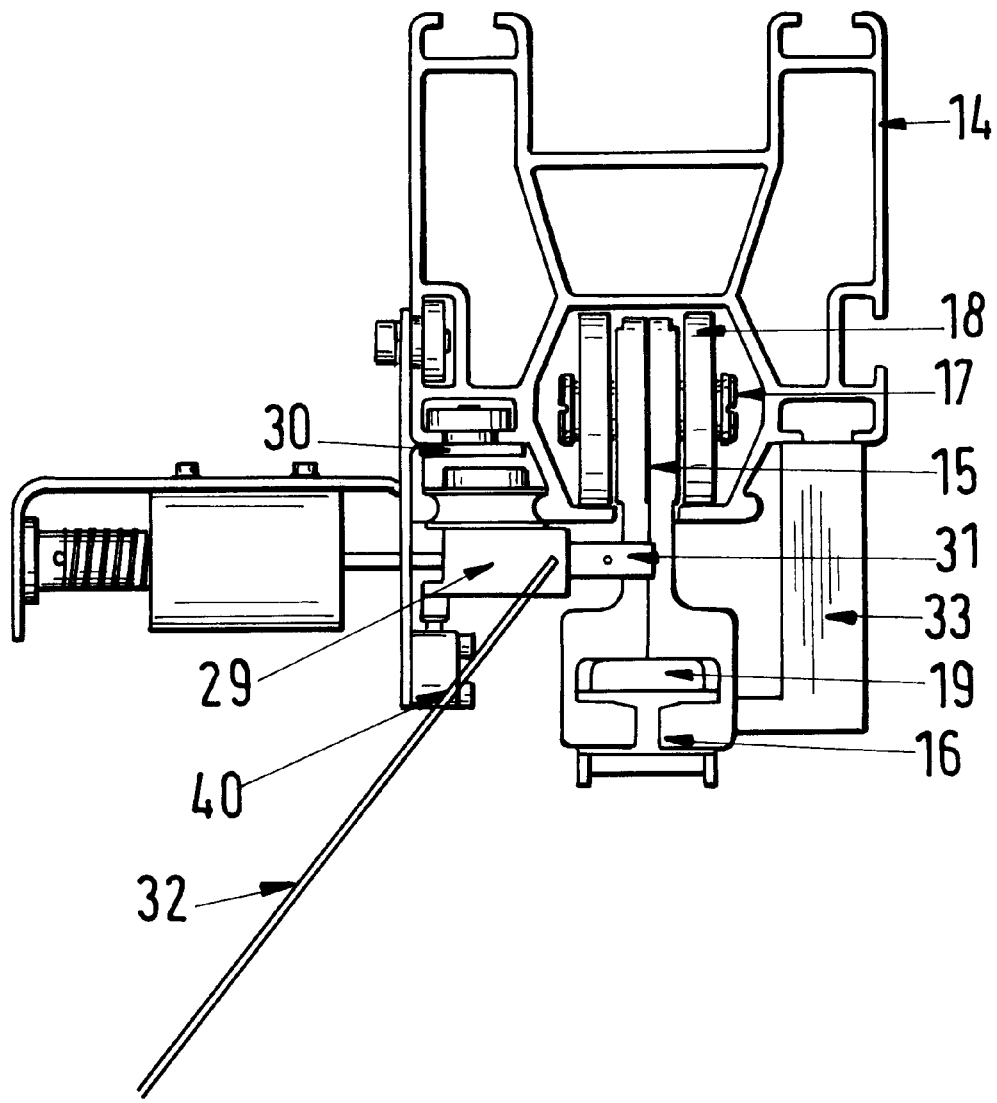
FIG. 3 shows a transversal section of the main circuit.
Figure 4:
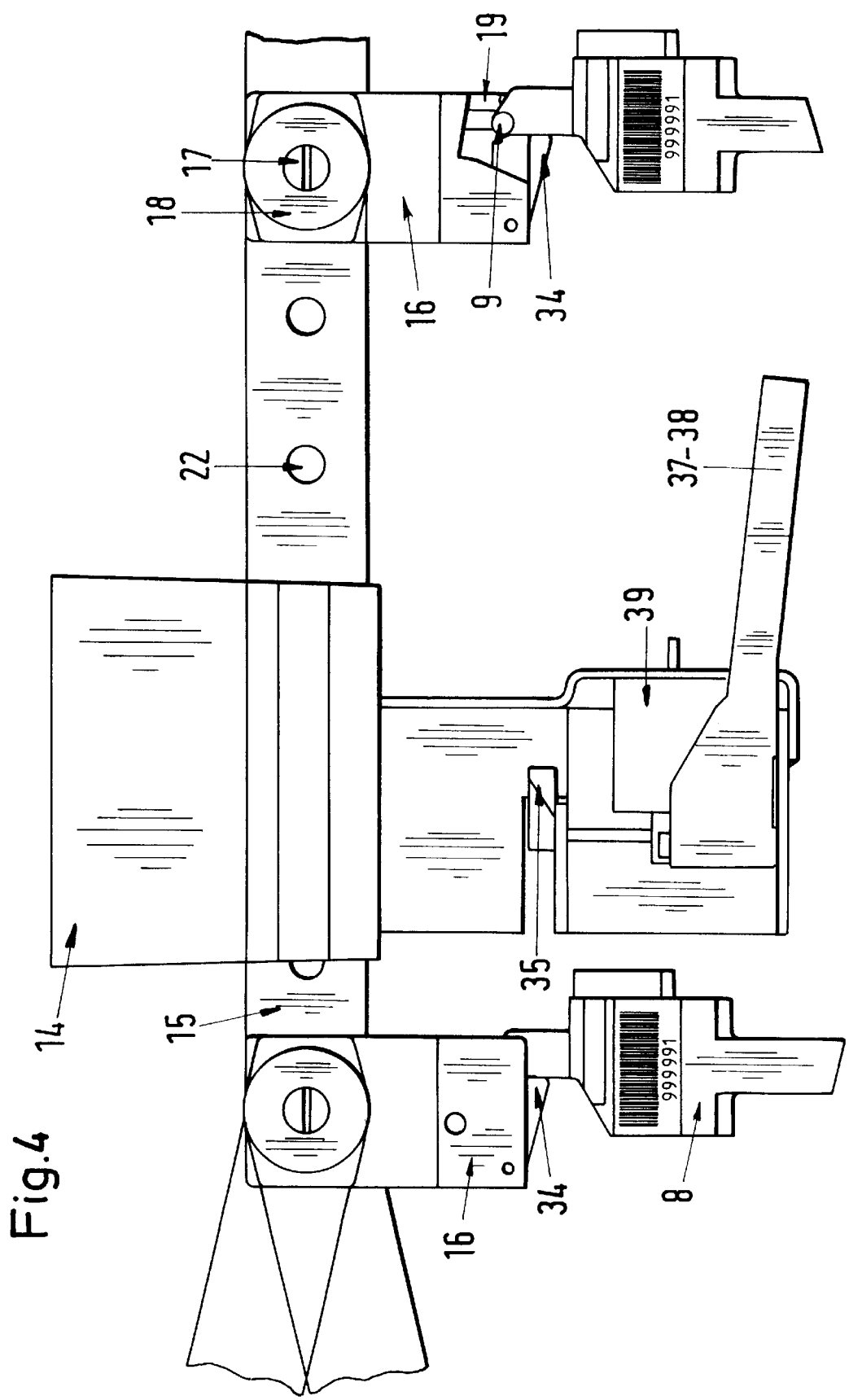
FIG. 4 shows the band of the main circuit and the output mechanism of the carriages on the main circuit.
Figure 5:
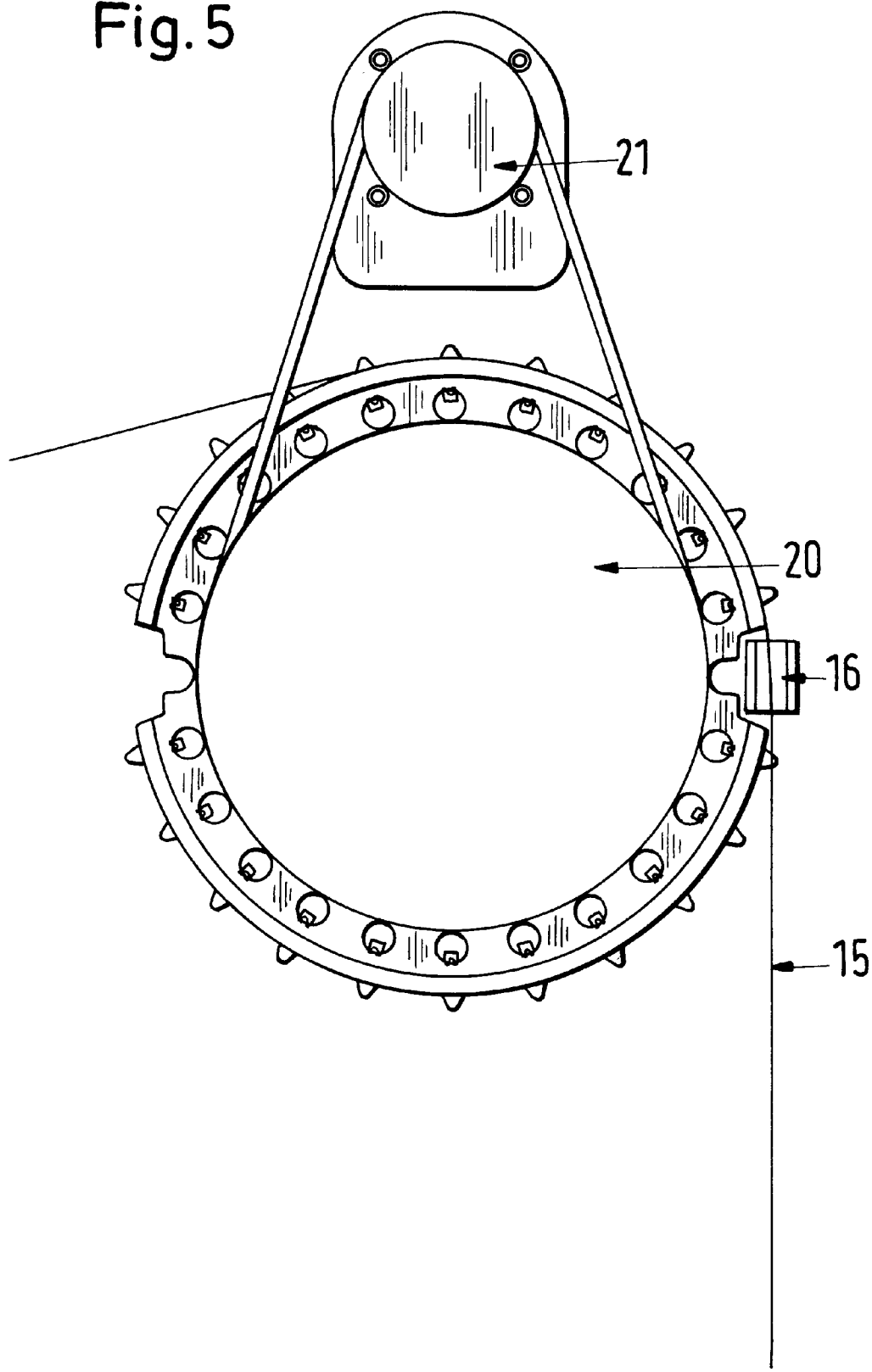
FIG. 5 represents the traction mechanism on the band and the horizontal curves of the main circuit.

The main circuit (2) is formed (see FIGS. 3 and 4) by an extruded profile (14) inside which a closed band runs, formed by a series of identical strips (15) joined by primary supports (16), so each support is rigidly attached to the strip (15) and articulated on the following strip by means of a horizontal axle (17). The primary supports (16) rest on the profile on wheels (18) to decrease friction, and include a gap (19) below the level of the adequate guide profile to allow guided entrance of the connection cylinder (9) for the carriages as explained below. The guide profile may turn curves or corners at a set angle on the vertical plane without preventing displacement along the inside of the band. To do so, the angle must be in relation to the length of the strips and the dimensions of the primary supports (16). At the ends of each stretch of profile (see FIG. 5), there is a wheel with nipples and gaps (20) clogged respectively into the drill holes (22) in the strips (15) and the primary supports (16) at the appropriate gages. These wheels form the horizontal curves of the main circuit, and some of them may have connection to a drive set (21) to transmit the necessary movement to the band.

Figure 6:
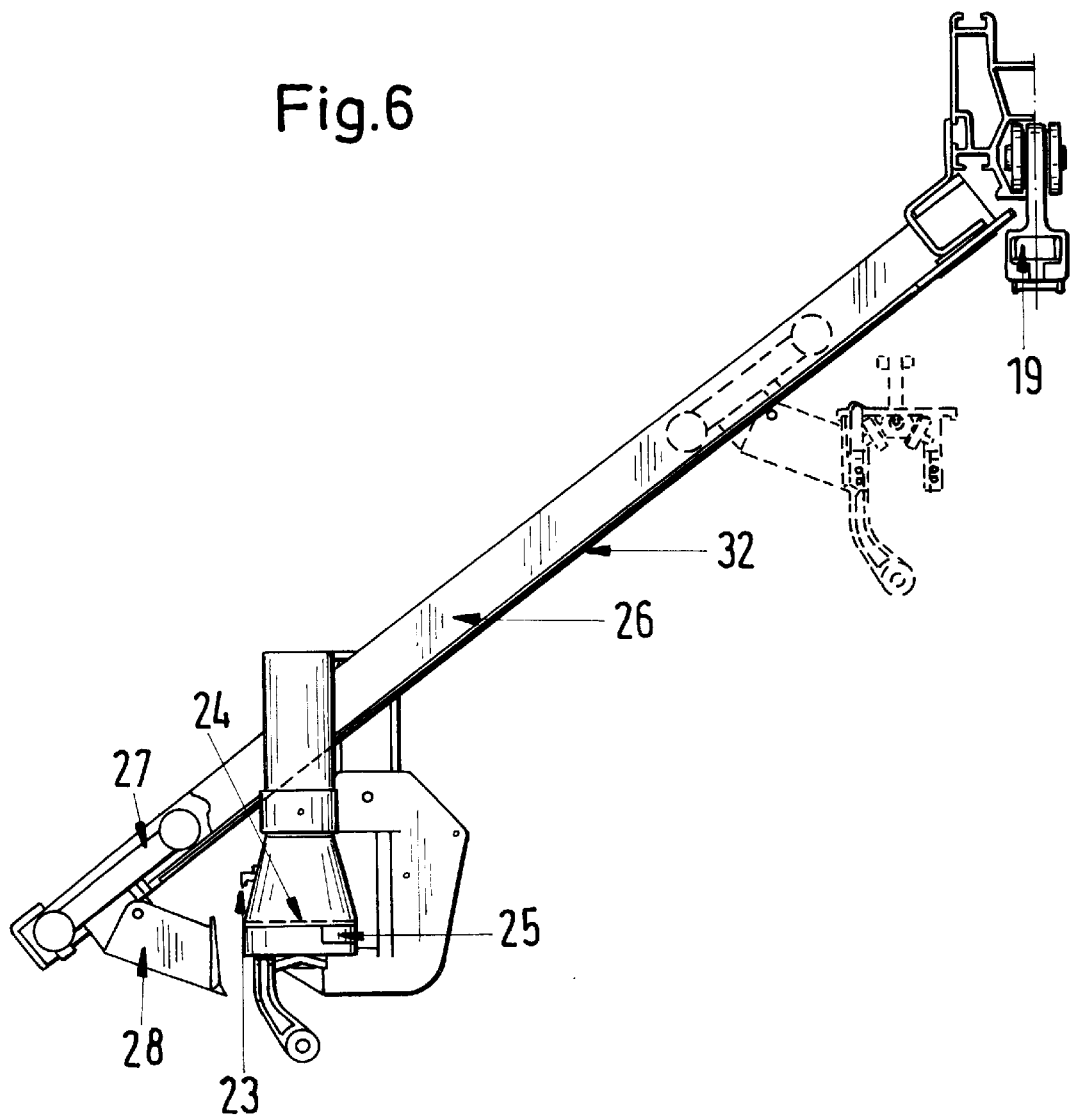
FIG. 6 shows the carriage hoist mechanism from the station to the main circuit.
Figure 7:
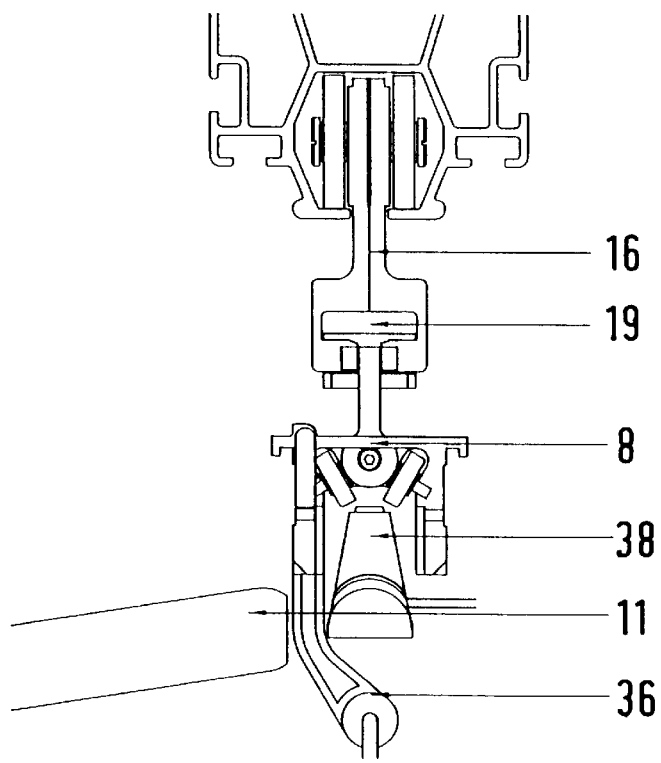
FIG. 7 shows a stretch of mobile rail receiving a carriage to be detoured.
Figure 7:
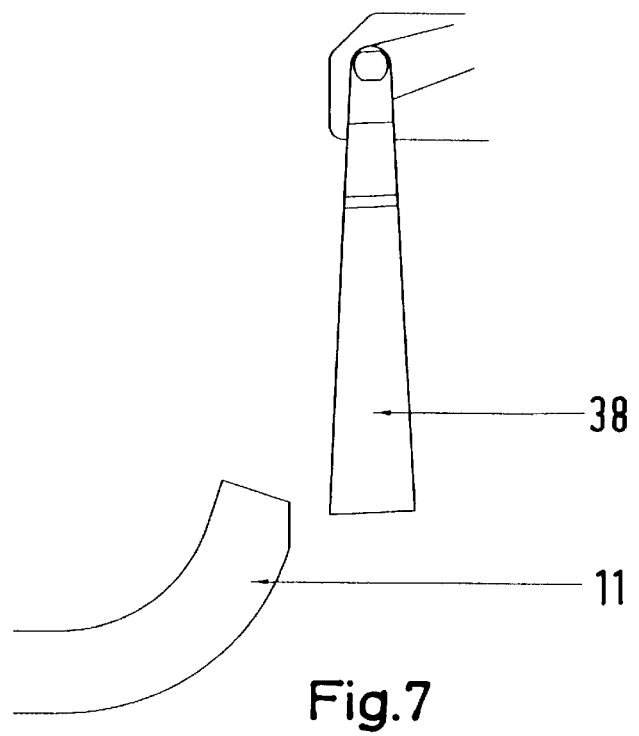

The stations receive the carriages (8) leaving the main circuit to perform any of the functions required in the process: system input, production operations, storage, classification, etc., for which diverse configurations are available. What they have in common is that they receive the carriages from the main circuit and the carriages are moved by gravity and supported on inclined rails on which there may be devices to retain the carriages and let them pass one by one when required for the relevant operation and then return to the main circuit from the lowest point (24) of the station (see FIG. 6). A carriage stop is located at this point (24) and a carriage presence detector (25) is set within the carriage. The carriage hoist mechanism includes a guide tube (26) inside which a small carriage (27) is guided by an arm (28) so it may hold the carriage by the flange (23). The length and location of the guide tube are such that the arm may hold the carriages at the point (24) and take them up to the cavity passing zone (19) for the primary supports on the main circuit. The small carriage (27) is attached by a flexible cable (32) to another drive carriage (29) with guided movement (see FIG. 3) on a lengthwise guide rail (30) included in the extruded profile (14). The drive carriage includes a mobile part (31) between the two positions activated by an electromagnet so when the part (31) is activated, it interferes with a primary support whose movement will run the drive carriage to the end of its guide rail where a cam moves the part (31) to the non-interference with primary support position. The return of the drive carriage to its initial position may be caused by the weight of the carriage (27), once the part (31) is disactivated. There is a relation between the length of the hoist tubes (26) and the lengthwise guide rail (30) and its relative positions that guarantee synchronized collection of the carriages by the primary supports, disactivating the part (31). The means for the arm (28) to hold the carriages is compatible with collection of the carriages by the primary supports without interference. The decision to raise a carriage from the station may be taken using the station control card, for which it requires the signal from the detector (25) that indicates carriage ready to be hoisted, the detector (40) that indicates the presence of the drive carriage at origin and of another detector (33) located on the main circuit that detects the presence of a carriage free primary support.

The carriages are held on the primary support (16) by an articulated trigger (34) having a contact surface with the connection cylinder (9) that forms an angle so the contact forces tend to keep the trigger (34) closed. The geometric shapes of the connection cylinder (9), the trigger (34) and the support surface of the main support are related to allow the carriage to drop when the trigger is turned upward by the activator (39) of the cam (35) that may in turn be activated by an electromagnet. The carriage is collected by a stretch of rail that may be fixed or mobile, according to the direction of the carriage on the main circuit and the later detour of the carriage toward a station located on the left or right of the main circuit. The direction of the carriage is the same throughout the system and is defined according to the position of the part (36) of the body of the carriage that connects the lower part, where the hanger hangs, to the upper part. In this case, we set the position of the carriage with that part (36) facing the right of the direction taken. This position indicates that the supports of the rails must be located on the left, so as not to interfere with the movement of the carriages and the stretch of the rail receiving the carriages on detours to the left may be fixed, while that for detours to the right must be mobile. Under such circumstances, detours to stations located on the left of the main circuit in the direction of the movement include, in addition to the relevant cam and electromagnet, a stretch of fixed rail (37) with a straight part under the wheels of the carriages running along the main circuit and another curved part fixed to the rail in the station. Detours to the right must include a stretch of mobile rail (38) to allow the intermediate part (36) of the carriage body through the main circuit. This stretch of mobile rail may be moved to receive the carriages to be detoured, with the same activator (39) for the cam (35). The stretch of mobile rail (38) must be identical to the fixed stretch (37), this requisite being applicable to all the parts making up each kind of station, so any station may be assembled indistinctly on the left or right of the main circuit, varying only the means of assembly of the parts when so required.

The system is completed by a series of mechanisms required for the stations to function, of a simple design that is evidently related to the geometry of the rails and the carriages, such as carriage dispensers, the concept of which may be based on any of the existing ones from other transport systems. Other necessary elements, such as band movement sensors, may obviously be commercial ones.

Control of the system is based on a designed control architecture. There is a control card for each two or more stations with sufficient intelligence to control all the electromechanical elements at these. The set of control cards are linked together and to the control computer by a serial communication network.

It will be apparent to those skilled in the art that various modifications and variations can be made in the aerial system of the present invention without deviating from the spirit or scope of the invention. Thus, it is intended that the present invention cover the modifications and variations of this invention provided they come within the scope of the appended claims and their equivalents.

What is claimed is:

1. An aerial system for automatic transportation, storage, classification and control of hanging lightweight products, comprising:
    a transport system formed by a main closed circuit (2) with a number of diverse stations (1, 3, 4, 5) on each side of the circuit, the main circuit having a series of identical flanges (15);
    a number of carriages (8) with joint holders for moving hanging production units along the main circuit;
    a number of primary supports (16), each having a holding part (19) to hold one of the carriages by the joint holder, so that the carriages may be transported hanging along said circuit, and a trigger having hold and release positions;
    a control computer to identify a position and status of the carriages at all times and to control their movement according to flexible preset routes;
    a series of detours to stations having a cam (35) that controls the position of the trigger releasing a relevant carriage;
    a stretch of fixed rail (37), coupled with one of said detours to a relevant station located on one side to provide movement of released carriage to said station; and
    a stretch of mobile rail (38), coupled with another one of said detours to another relevant station located on the opposite side to provide movement of the released carriage to said another station.

2. The aerial system according to claim 1, including means to identify the carriages and the stations. and provide information of a carriage position.

3. The aerial system according to claim 1, wherein the joint holder is a cylindrical holder (9) at the top of the carriage for connecting to the primary support using the trigger.

4. The aerial system according to claim 3, wherein the carriage has wheels (10) to rest and move on the rails of the stations.

5. The aerial system according to claim 4, wherein the carriage further includes U-shaped lateral flanges (23) to allow holding in order to identify an identification code (12) attached to the carriage by a code reader.

6. The aerial system according to claim 5, wherein the carriage includes a rigid element (36) to transmit a hanger toward the wheels, or toward the cylindrical holder, or to the flanges.

7. The aerial system according to claim 6, including a hoist mechanism having a carriage presence detector (25) at its lowest point, and a hoist arm (28) shaped to pick the carriage up by the flanges (23), wherein the hoist arm (28) is articulated on a small hoist carriage (27) mounted with ability to move along a hoist tube (26), the upper end of said tube is at level with the main circuit.

8. The aerial system according to claim 7, further including a flexible cable (32) that is rigid to traction and runs over a pulley, connecting the hoist carriage to a drive carriage (29) that may be moved guided along a lengthwise guide (30) included in the main circuit.

9. The aerial system according to claim 8, wherein the drive carriage (29) has a mobile part (31) and an activator to move the mobile part between a position of interference and non-interference with the primary support.

10. The aerial system according to claim 9, further including a presence detector (40) for detecting presence of the drive carriage (29) at its original position and a detector (33) for detecting carriage-free primary support, and means for linking the lengths and positions of the hoist tube, the lengthwise guide and the flexible cable to make initial positions of the hoist carriage (27) and the drive carriage (9 to coincide with their final positions, so that the cylindrical holder (9) of the carriage (8) coincides with the holding part (19) on the primary support.

11. The aerial system according to claim 10, further including communication means for information exchange between the control computer and work, storage and/or classification zones.

12. A method of automatic transportation, storage, classification and control of hanging lightweight products, comprising steps of:
    providing a transport system formed by a main closed circuit (2) with a number of diverse stations (1, 3, 4, 5) on each side of the circuit;
    providing hangers for placing production units. the hangers specifically designed according to shape of the production units and performed production operations;
    providing intermediate supports, or carriages, with identification codes to hold the hangers and to monitor the position and status of each production unit during the operation process;

providing primary supports for holding the carriages and moving them along the main circuit;

moving carriages from the main circuit to the stations to perform any of process operations;

providing the stations with inclined rails for receiving the carriages moving by gravity to the lowest point of the station (24);

returning the carriages after completion of the process operation to the lowest point of the stations;

providing a hoist mechanism with a drive carriage for hoisting the carriage;

connecting the drive carriage to the carriage to be dragged;

dragging the carriage up to the main circuit; and disconnecting the drive carriage from the primary support, allowing the drive carriage to return to its initial position.

* * * * *